May 4, 1926.

J. A. DODD 1,582,973

MACHINE FOR FORMING AND TRIMMING METAL SHELLS

Filed May 5, 1924    5 Sheets-Sheet 1

Inventor:
John A. Dodd,
By Jas. C. Nobusmith
Attorney.

May 4, 1926.

J. A. DODD 1,582,973

MACHINE FOR FORMING AND TRIMMING METAL SHELLS

Filed May 5, 1924    5 Sheets-Sheet 2

Inventor:
John A. Dodd,
By
Jas. C. Hobrusmith
Attorney.

May 4, 1926.

J. A. DODD 1,582,973

MACHINE FOR FORMING AND TRIMMING METAL SHELLS

Filed May 5, 1924   5 Sheets-Sheet 3

Inventor:
John A. Dodd,
By Jas. C. Hobnesmith
Attorney

May 4, 1926.
J. A. DODD
1,582,973
MACHINE FOR FORMING AND TRIMMING METAL SHELLS
Filed May 5, 1924   5 Sheets-Sheet 4
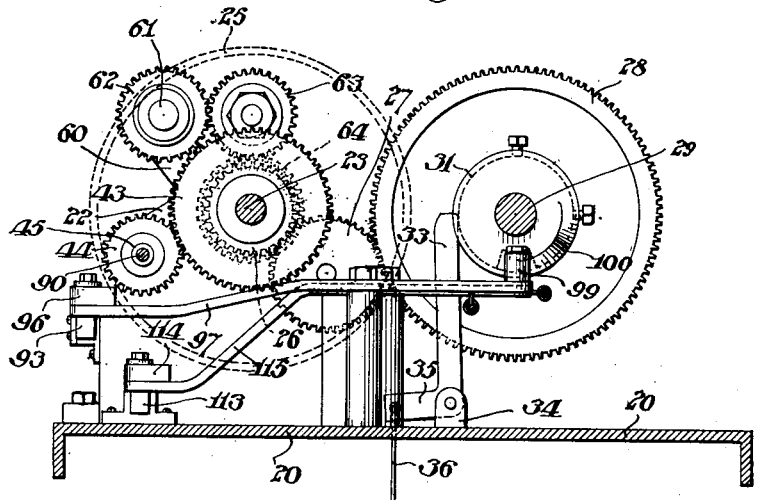
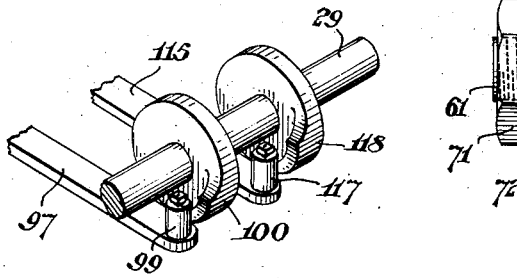
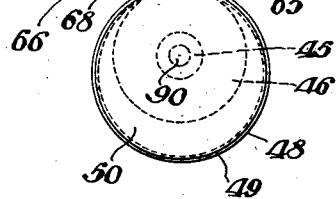
Inventor:
John A. Dodd,
By Jas. C. Hobensmith
Attorney.

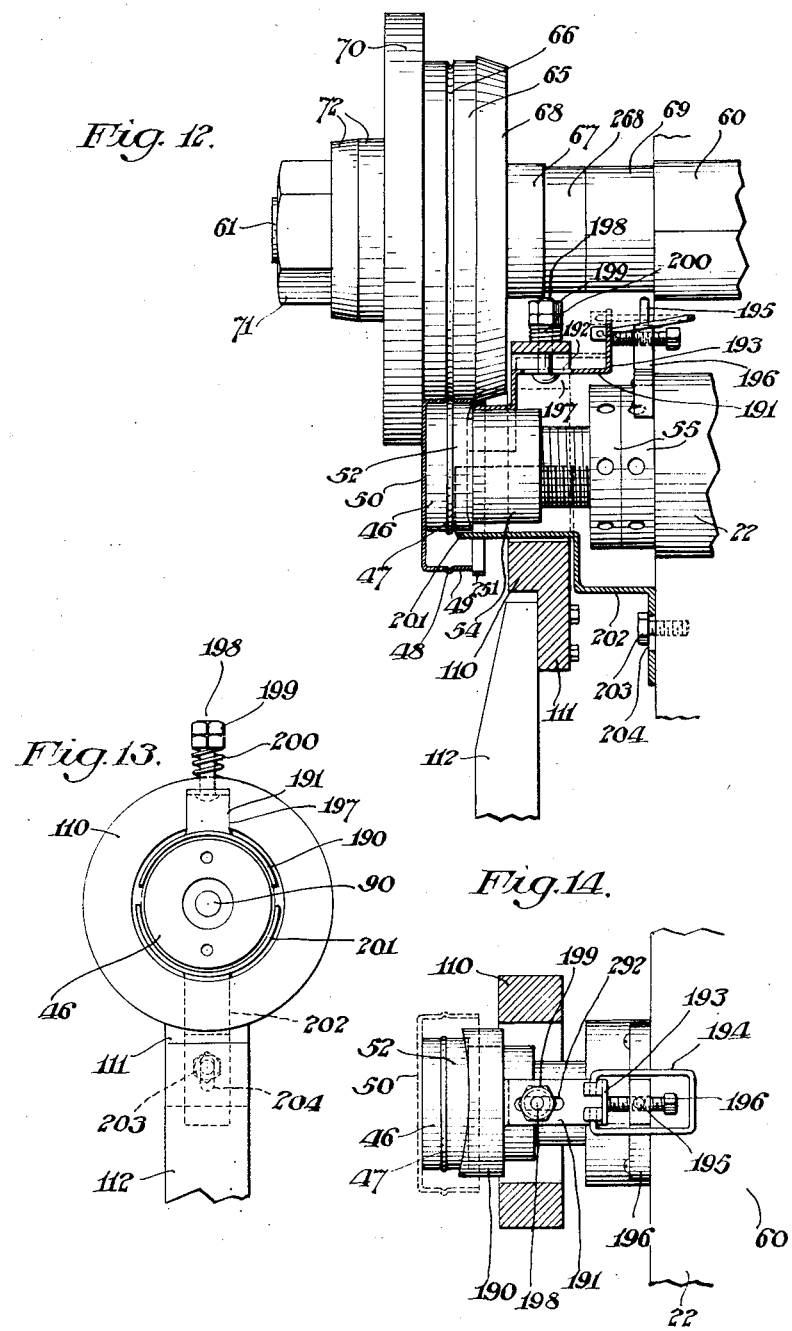

Patented May 4, 1926.

1,582,973

UNITED STATES PATENT OFFICE.

JOHN A. DODD, OF CAMDEN, NEW JERSEY.

MACHINE FOR FORMING AND TRIMMING METAL SHELLS.

Application filed May 5, 1924. Serial No. 711,117.

*To all whom it may concern:*

Be it known that I, JOHN A. DODD, a citizen of the United States, residing at Camden, in the county of Camden and State of New Jersey, have invented certain new and useful Improvements in Machines for Forming and Trimming Metal Shells, of which the following is a specification.

My invention relates to a machine for forming and trimming metal shells, that is to say, for working, in the side walls of metal shells used for salve boxes, bottle and jar caps, and the like, beads, threads, nurling, and the like; and for simultaneously trimming said shells, the same relating more specifically to that type of machine in which the beads, threads, nurling, and the like are formed in the side walls of the shells by a rolling operation.

The principal object of my invention is to provide a relatively simple and efficient machine for beading, threading, or nurling the side walls of cylindrical metal shells, and for simultaneously trimming the same, in which the various operations will be automatic, and which machine will be more satisfactory in its action than the machines for such purpose at present in use.

With this object in view, my invention contemplates the provision of an improved form of forming rolls, improved means for feeding the metal shells to the forming rolls, improved means for removing the formed shells, as well as the scrap trimmed therefrom, from the forming rolls, and improved means for separating the shells from the scrap.

The nature and characteristic features of my invention will be more readily understood from the following description, taken in connection with the accompanying drawings forming part hereof, in which:

Fig. 5 is a transverse section, taken approximately on the line 5—5 of Fig. 1, certain parts being omitted to illustrate certain details of the mechanism more clearly;

Fig. 6 is a fragmentary perspective view, illustrating the arrangement of the cams for controlling the movement of the ejector and scrap stripping mechanism;

Fig. 7 is an enlarged sectional detail view illustrating the arrangement of the forming and trimming rolls, the same being shown in the operative position;

Fig. 8 is an enlarged end elevation of a portion of the structure shown in Fig. 7, certain portions being shown in section to illustrate the arrangement more clearly;

Fig. 9 is a transverse vertical section of the delivery chute, illustrating certain means for more effectively separating the scrap from the finished shells;

Fig. 10 is a perspective view of a finished shell, illustrating one form of the same, which is adapted to be made upon the machine arranged as shown in the drawings;

Fig. 11 is a similar perspective view of a typical piece of scrap which is trimmed from the shell;

Fig. 12 is an elevational view, partly in section, illustrating a modified form of arrangement of the forming rolls, and also showing auxiliary mechanism adapted to be used in connection therewith for more positively insuring the removal of the scrap from the lower forming roll;

Fig. 13 is an end elevation of the lower portion of the structure shown in Fig. 12; and Fig. 14 is a plan view, partly in section, of the lower portion of the structure shown in Fig. 12.

Figure 1:
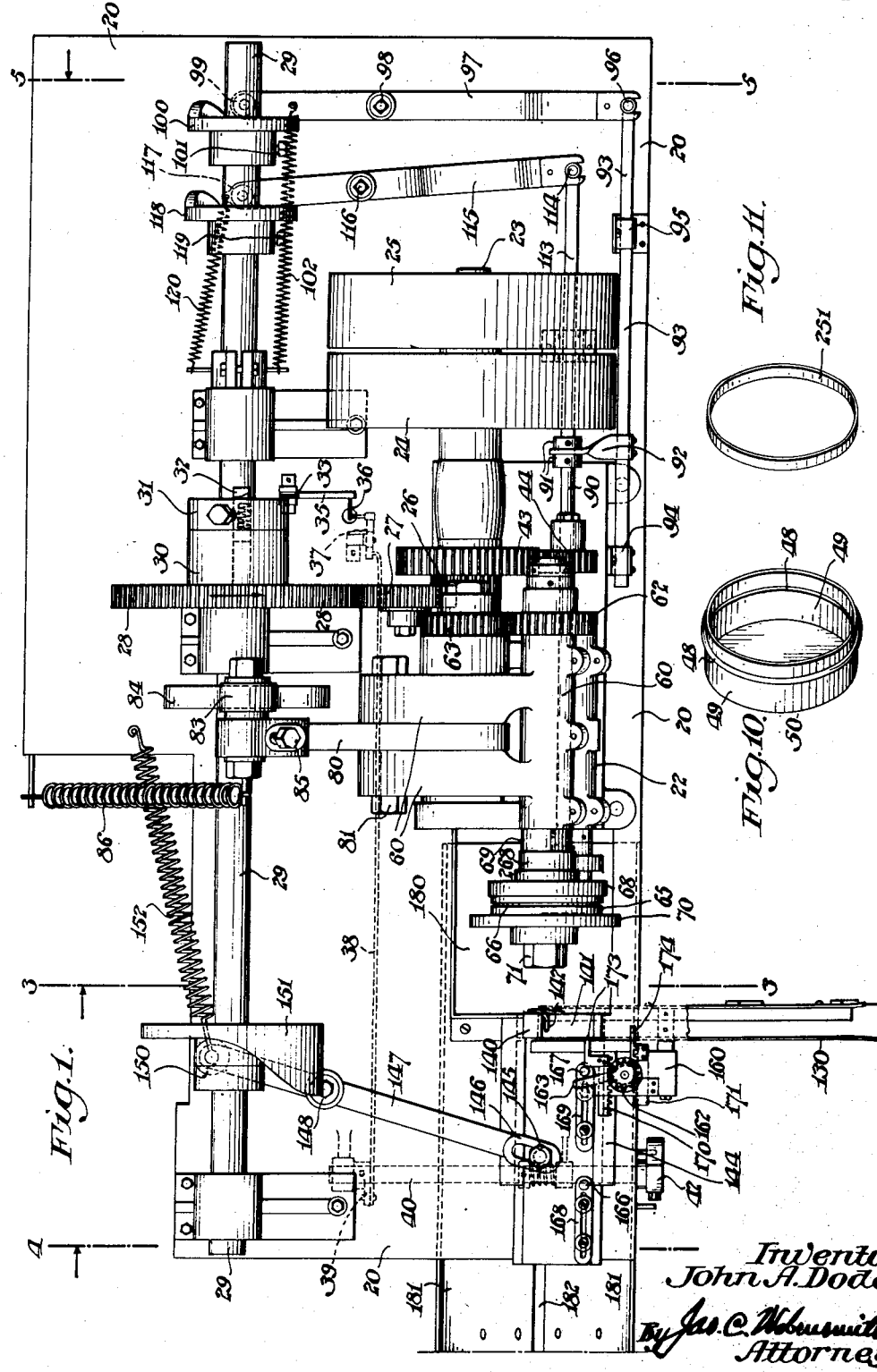
Figure 1 is a top or plan view of a machine embodying the main features of my present invention.
Figure 2:
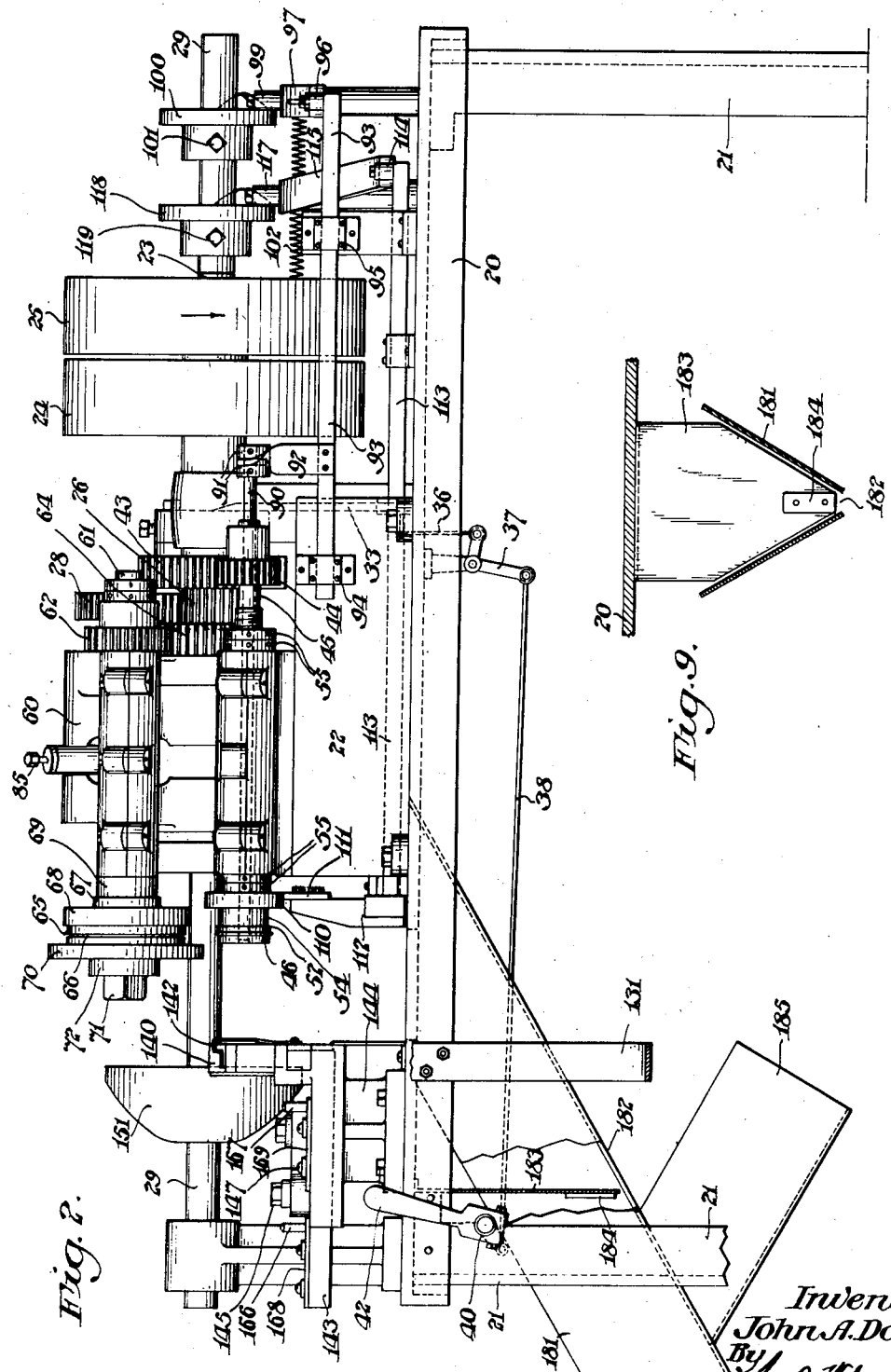
Fig. 2 is a front elevation thereof, the supply chute being removed and other parts broken away for the purpose of more clearly illustrating certain other parts of the machine.
Figure 3:
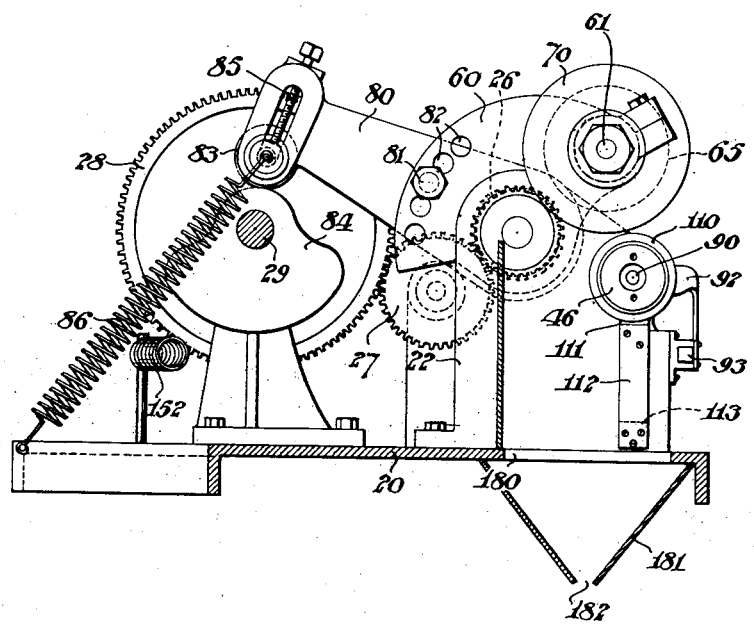
Fig. 3 is a transverse section of the machine, taken approximately on the line 3—3 of Fig. 1.
Figure 4:
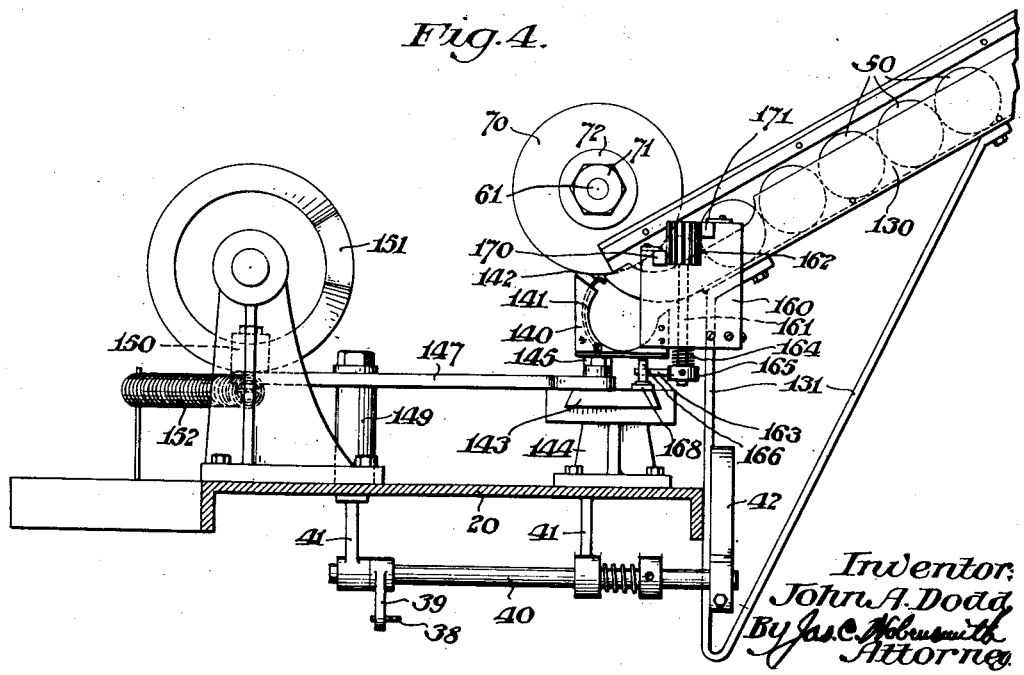
Fig. 4 is a similar section, taken approximately on the line 4—4 of Fig. 1, certain of the parts being shown in end elevation to illustrate the same more clearly.

Referring to the drawings, in the particular embodiment of my invention therein shown, 20 is the bed plate upon which the various parts of the machine are mounted, this bed plate being supported by suitable leg members 21. Upon the bed plate 20 there is also mounted an auxiliary bed or framework 22, upon which certain of the parts are mounted. A power shaft 23 is journaled in suitable bearings provided in the auxiliary bed or framework 22. Upon the power shaft 23 are mounted fast and loose pulleys, 24 and 25 respectively. A pinion 26, mounted on and secured to the power shaft 23, meshes with and drives an idler gear 27, which in turn meshes with and drives a gear 28, which is mounted on a cam shaft 29.

The gear 28 is provided with a hub 30, which is arranged adjacent a clutch collar 31 which is fixedly secured to the cam shaft 29. A suitable clutch pin 32 of the ordinary type is provided in the collar 31 for the purpose of locking the hub 30 of the gear 28 to the collar 31, this clutch pin 32 being controlled by a latch 33, pivoted to a bracket 34 extending upward from the bed plate 20. The latch 33 is provided with a lever arm 35, which is connected by a rod 36 to a bellcrank lever 37, which in turn is connected by a rod 38 to a lever 39. The lever 39 is mounted on and secured to a shaft 40, which is journaled in suitable brackets 41 depending from the under side of the bed plate 20. The shaft 40 extends to the side of the machine, and on the end thereof there is secured a hand lever 42, the arrangement being such that when the hand lever 42 is shifted, the latch 33 will be actuated by the intervening parts above described for the control of the clutch pin 32 which is mounted in the collar 31 for the purpose of locking the gear 28 and its hub 30 to the cam shaft 29, whereby said cam shaft will be rotated when said clutch pin is in the locking position.

A gear 43 is also mounted upon and secured to the power shaft 23, this gear 43 meshing with and driving a pinion 44, which is mounted on and secured to a hollow spindle 45, which extends through and is journaled in a portion of the auxiliary bed or framework 22. Upon the front end of the hollow spindle 45 the lower or internal forming roll 46 is fixedly secured, this internal forming roll, in the form shown, being provided with a rib 47 for forming the bead 48 in the side wall 49 of the metal box shell 50. The forming roll 46 is also provided with a boss 51, upon which is mounted an annular cutter 52, a plurality of annular shims 53 being interposed between the cutter 52 and the body portion of the forming roll 46, so as to maintain the cutting edge of the cutter 52 the proper distance from the annular rib 47. A sleeve 54 is threaded on the hollow spindle 45, and serves to clamp the cutter member 52 to the forming roll 46. The hollow spindle 45 is externally threaded adjacent each end of the framework 22 in which the same is journaled, and upon this threaded portion there are mounted adjusting nuts 55 to enable the hollow spindle 45 to be longitudinally adjusted in its journals.

A rocking frame 60 is journaled in the bed or framework 22, with its axis of oscillation preferably coincident with the axis of the power shaft 23, and in this rocking frame 60 a shaft 61 is journaled. Mounted on and secured to the shaft 61 is a gear 62, which meshes with and is driven by an idler gear 63, which in turn meshes with and is driven by a gear 64, which is mounted on and secured to the power shaft 23. Upon the front end of the shaft 61 is the upper or external forming roll 65, which is provided with an annular groove 66, complemental to the rib 47 on the lower or internal forming roll 46, for the purpose of rolling the bead in the side walls 49 of the metal box shells 50. Adjacent the external forming roll 65 there is mounted, on the shaft 61, a flanged collar 67, upon which an annular cutter 68 is mounted. The cutting edge of the cutter 68 coacts with the cutting edge of the cutter 52 which is mounted adjacent the lower forming roll 46. The cutter 68 is held adjacent the upper forming roll 65 by means of a sleeve 268, which abuts against an enlarged shouldered portion 69 of the shaft 61, which enlarged portion takes the thrust against the end of the bearing in the rocking frame 60 in which the shaft 61 is journaled.

Adjacent the outer face of the upper forming roll 65, there is mounted a flange disk 70, projecting beyond the forming roll 65 and adapted to retain the metal box shell in proper position with respect to the forming rolls during the forming operation. The outer end of the shaft 61 is threaded for the mounting thereon of a retaining nut 71, which serves to secure the various parts of the upper forming roll and cutter to each other, and on the shaft 61. Washers 72 may, when required, be interposed between the clamping nut 71 and the outer face of the flange disk 70 adjacent the upper forming roll 65, so as to permit forming rolls of various shapes and sizes to be alternatively mounted on the shaft 61.

The rearward portion of the rocking frame 60 is bifurcated for the mounting of a lever arm 80, which is adjustably secured thereto by means of a bolt 81 and the provision of a plurality of apertures 82 in the rocking frame 60, in one of which said bolt 81 is adapted to be selectively placed for the purpose of effecting the adjustment. The outer end of the lever arm 80 carries a roller 83, which rests on a cam 84 which is mounted on and secured to the cam shaft 29. The roller 83 is adjustable in the end of the lever arm 80 by means of a bolt 85, this bolt 85 serving as a means of fine adjustment, while the coarse adjustment is provided by means of the bolt 81 and apertures 82 hereinbefore mentioned. The roller 83 is held against the cam 84 by means of a coil spring 86, which serves to elevate and hold the upper forming roll 65 away from the lower forming roll 46 at a certain period during each revolution of the cam shaft 29.

An ejector rod 90 is mounted within the hollow spindle 45, extending therethrough and projecting out at the rear thereof, and upon the rear end of the ejector rod 90 there are mounted collars 91, between which extends the bifurcated end of an arm 92 which is secured to a slidable rod 93. The slidable rod 93 is guided in suitable brackets 94 and 95 secured to stationary portions of the structure. One end of the slidable rod 93 is provided with a pin 96, which is engaged by the forked end of a lever 97, which lever 97 is pivoted as at 98, and is provided at its other end with a roller 99, which bears against the face of a cam 100. The cam 100 is adjustably secured to the cam shaft 29 by means of a set-screw 101. A spring 102 serves to maintain the roller 99 against the face of the cam 100, thereby normally retracting the ejector rod 90 to its rearmost position, through the intervening mechanism above described.

For the purpose of removing the scrap ring which is cut from the finished shell, there is provided a collar member 110, which surrounds the sleeve 54 which is mounted on the hollow spindle 45 behind the cutter 52. The collar 110 is secured by means of an extension 111 to a bracket arm 112, which is secured in turn to one end of a slidable rod 113. The other end of the slidable rod 113 is provided with a pin 114, which is engaged by the forked end of a lever 115, which lever 115 is pivoted as at 116 and carries a roller 117. The roller 117 bears against the face of a cam 118, which is mounted on the cam shaft 29 and secured thereto by means of a screw 119. A spring 120 serves to maintain the roller 117 against the face of the cam 118, thereby retracting the collar 110 to its rearmost position, through the intervening mechanism above described.

An inclined supply chute 130 is secured by means of a bracket 131 to the bed plate 20, into which chute 130 are placed the metal shells to be formed and trimmed; and for the purpose of delivering the metal shells from the chute 130 to the lower forming roll 46, one by one, there is provided a carrier 140, comprising a member having a pocket 141 adapted to receive one of the shells. A light spring 142 serves to retain the shell against displacement within the pocket 141 during the movement, hereinafter described, of the receptacle 140 for the purpose of delivering the shell to the lower forming roll 46. The carrier 140 is mounted at one end of a slide member 143, which is supported in a suitable bracket 144, which bracket is secured to the bed plate 20.

The slide member 143 is provided with an upwardly extending pin 145, which is engaged by the slotted end 146 of a lever 147, which lever 147 is pivoted as at 148 to a stud 149 projecting upward from the bed plate 20. The other end of the lever 147 carries a roller 150, which bears against the face of a cam 151 which is mounted on and secured to the cam shaft 29. A spring 152 serves to hold the roller 150 against the face of the cam 151, and thereby retract the slide member 143 and the receptacle 140 which is mounted thereon at the proper period of each rotation of the cam shaft 29.

For the purpose of controlling the delivery of the metal shells from the chute to the carrier 140, there is provided an escapement mechanism at the lower end of the chute 130, comprising a bracket member 160, to which is journaled a vertical spindle 161, on the upper end of which is mounted a pinion 162. Upon the lower end of the spindle 161 there is mounted a projecting arm 163, which extends over the top of the slide member 143. A spring 164 is interposed between the boss 165 of the arm 163 and the bottom of the bracket member 160, so as to impart a frictional resistance to prevent undesired turning of the spindle 161 and the parts associated therewith.

Mounted on the slide member 143 are upwardly projecting pins 166 and 167, which are provided with slotted attaching plates 168 and 169 respectively, which permit a longitudinal adjustment of said pins on the slide member 143. The upwardly projecting pins 166 and 167, carried by the slide member as aforesaid, are adapted to encounter the projecting arm 163 and thereby actuate the spindle 161 and the parts associated therewith, as the slide member approaches its respective forward and retracted positions.

Meshing with the pinion 162, which is mounted on the upper end of the spindle 161, are two racks 170 and 171, these racks being arranged on opposite sides of the pinion 162, so that, as said pinion is actuated, the racks will be reciprocated with respect to each other, that is to say, that as the rack 170 is advanced, the rack 171 will be retracted, and vice versa. The rack 170 has secured thereto a finger 173, and likewise the rack 171 has secured thereto a finger 174, these finger members 173 and 174 being adapted to control the passage of the shells from the chute 130 to the pocket 141 of the carrier 140.

The bed plate 20 is cut out, as at 180, immediately below the forming rolls, to permit the formed shells and the scrap to fall therethrough when the same are removed from said forming rolls, and beneath said opening 180 there is mounted an inclined delivery chute 181, the side walls of which are inclined to each other and sufficiently separated at the bottom, as at 182, to permit the ring of scrap 251, which is cut from the shell during the time of the forming operation, to fall therethrough, while at the same time retaining the finished shells (shown in Fig. 10) within the inclined chute, and causing the same to pass down said chute by gravity, to be delivered to a suitable box or receptacle, not shown. In order to facilitate the separation of the rings of scrap 251 from the finished shells, there is provided a flexible apron 183 (see Fig. 9), depending from the under side of the bed plate 20 into the V-shaped delivery chute 181, and provided at its lower end with a weight 184, which will afford sufficient impedance to insure the scrap falling through the slot or opening 182 at the bottom of the delivery chute 181, while at the same time permitting the shells to pass. If desired, an auxiliary chute 185 may be provided below the delivery chute 181, to insure the return and separation of any of the rings of scrap which may pass beyond the apron 183 before passing through the slot 182.

The operation of the machine, as above described, may now be explained. The main shaft 23 being rotated by means of the driving pulley 24, the lower hollow spindle 45 will be rotated by means of the gears 43 and 44, and consequently the lower forming roll 46, which is mounted at the front end of the spindle 45, will be continuously rotated. At the same time, the upper spindle 61 will also be continuously rotated by means of the gears 64, 63, and 62, the gear ratios being such that the upper forming roll 65 will be rotated with substantially the same peripheral speed as that of the lower forming roll 46. The hand lever 42 being shifted to the proper position, the latch 32 will be actuated by the intervening link work, as hereinbefore set forth, thereby permitting the clutch pin 32 in the collar 31 to move to such position as to lock the gear 28 and its hub 30 to the cam shaft 29. The motion of the power shaft 23 will then be transmitted by means of gears 26, 27, and 28 to the cam shaft 29.

One of the metal shells 50 having previously been deposited in the pocket 141 of the carrier 140, the slide 143 will be moved toward the lower forming roll 46, this action being accomplished by means of the lever 147, which, as before stated, is provided with a roller 150, which is held by coil spring 152 against the face of the cam 151 which is mounted on and secured to the cam shaft 29.

The slide member 143 and the carrier 140, which is secured thereto, are moved forward a sufficient distance to deposit the metal shell over the lower forming roll 46. Meanwhile, the cam shaft 29 continuing to rotate, the cam 84 will, through the intermediary of the roller 83 and lever arm 80, cause the rocking frame 60 to be actuated, thereby causing the upper spindle 61, and consequently the upper forming roll 65 and the parts associated therewith, to be lowered to coact with the lower forming roll 46 and the parts associated therewith. The flange member 70 will then engage the outer face of the metal shell 50, which has previously been deposited on the lower forming roll 46, and thereby properly maintain the position of said metal shell between the forming rolls.

As the forming rolls are thus brought into juxtaposition, and as said forming rolls continue to rotate, the rib 47 of the lower forming roll 46, coacting with the annular groove 66 in the upper forming roll, will form the bead 48 in the side wall of the metal shell. Simultaneously with this action, the cutter 52, which is associated with the lower forming roll 46, and the cutter 68, which is associated with the upper forming roll 65, will coact at their cutting edges to sever the ring of scrap 251 from the metal shell, thus insuring trimming the edge of the shell a uniform distance from the bead which is formed in the side wall thereof.

When the slide member 143 advances to the forward position to place the metal shell on the forming roll 46, the pin 166, which is carried by the slide member 143, will encounter the arm 163 which extends from the lower end of the vertical spindle 161 which is journaled in the bracket member 160 at the lower end of the supply chute 130. The spindle 161 will thereby be actuated to cause the lowermost finger 173, which is carried by the rack 170, to be advanced in the path of travel of the shells which are mounted in the supply chute 130. Simultaneously the uppermost finger 174 will be retracted by means of the rack 171, thus permitting the column of shells in the supply chute 130 to descend until the same are stopped by the lowermost finger 173, as aforesaid.

After the slide member 143 and the carrier 140, which is mounted thereon, have completed the delivery of the metal shell, previously held in the pocket 141 of the carrier 140, to the forming roll 46, the slide member 143 will be retracted (as the cam 151 continues to rotate) to the position shown in Fig. 1 of the drawings, and, as the slide member 143 approaches its extreme retracted position, the pin 167 carried thereby will encounter the projecting arm 163 at the lower end of the spindle 161, whereby the gear 162, carried at the upper end of the spindle 161, will again be actuated, but in the reverse direction, thereby causing the lowermost finger 173 to be withdrawn out of the path of travel of the column of shells in the supply chute 130, and permitting the lowermost shell in said chute to pass into the pocket 141 of the carrier 140, to be delivered to the forming roll 46 in the next cycle of operations. Simultaneously with the retraction of the lowermost finger 173, the uppermost finger 174 will be advanced in the path of travel of the column of shells in the supply chute, and will thereby hold back all of the shells in the supply chute 130 with the exception of the one which has been freed by the retraction of the lowermost finger 173.

After the bead 48 has been formed in the side wall 49 of the metal shell 50, by the forming rolls 46 and 65, the cam shaft 29 continuing to rotate, and the cam 84 being so shaped as to permit the rocking frame 60 to be actuated, the upper spindle 61 and the parts carried thereby will now be raised, this action being accomplished by means of the coil spring 86 which extends between the end of the lever 80 and the bed plate 20. After the upper spindle has been thus raised to cause the upper forming roll 65 to be moved away from the metal shell which is mounted on the lower forming roll, and to cause the flange member 70, which is associated with the upper forming roll 65, to be freed of engagement with the outer face of the shell 50, the cam 100 will then cause the lever 97 to be actuated, thereby longitudinally shifting the slide rod 93 and the forked member 92 carried thereby. As hereinbefore described, the forked member 92 engages the collars 91 on the rear end of the ejector rod 90 which passes through the lower hollow spindle 45. The ejector rod 90 will thus be moved forward, and the front end thereof will encounter the wall of the metal shell and cause the same to be knocked off the lower forming roll 46, after which the same will fall through the opening 180, which is provided in the bed plate 20 below the forming rolls, into the delivery chute 181.

Closely following the action of the ejector mechanism above described, the cam shaft 118 will cause the lever 115 to be actuated, thereby imparting a forward movement to the slide rod 113, upon the forward end of which is secured the bracket arm 112, upon which in turn is mounted the collar member 110 which surrounds the collar 54 which is mounted on the hollow spindle 45 behind the cutter 52, and consequently, said collar member will be moved forward.

As the collar member 110 is thus moved forward, the same will encounter the ring of scrap which has been trimmed from the metal shell, and will push the same forward over the end of the forming roll 46, it being understood that, while the cutter 52 forms a slight shoulder relative to the collar 54, the rotative movement of certain of the parts will ordinarily be sufficient to free the same therefrom as the collar is advanced by the mechanism and in the manner above described. In some instances, however, it may be found necessary to provide additional mechanism for positively insuring the removal of the ring of scrap from the lower forming roll and its associated parts before the delivery thereto of the next shell to be formed, and there is hereinafter described certain mechanism which will be found useful for such purpose.

After the formed shells and rings of scrap are removed from the lower forming roll as aforesaid, the same fall through the opening 180 in the bed plate 20 into a delivery chute 181, which, as hereinbefore described, is V-shaped in cross-section, having its side walls converging to a slot 182 at the bottom thereof. This slot 182 is of such dimensions as to permit the rings of scrap 251 to pass therethrough, while at the same time retaining the finished metal shells within the chute 181, and causing the same to pass by gravity to the forward end thereof. As hereinbefore pointed out, the depending apron 183, provided with the weight 184 at the lower end thereof, will serve to retard the passing shells and scrap sufficiently to insure the separation of the same as aforesaid.

In Figs. 12 to 14, there is shown an auxiliary mechanism for more positively insuring that the ring of scrap which has been trimmed from the metal shell shall be freed properly and removed from the lower forming roll 46 prior to the deposit thereon of the next shell to be formed. In this construction, the arrangement of the upper and lower forming rolls is substantially similar to that shown in Figs. 1 to 8 of the drawings, with the exception that the peripheral face of the upper cutter 68 is preferably inclined or frusto-conical in shape (see Fig. 12), so as to provide a clearance space toward the rear in which the severed ring of scrap 251 may temporarily be lodged.

There are, however, provided in this construction certain additional parts, including a sector plate 190 which extends over the collar 54 at the rear of the lower cutter 52, this sector plate being so located during the trimming operation as to be interposed between the severed ring of scrap 251 and the collar 54. The sector plate 190 is positioned by means of a bracket portion 191 which extends upward to the rear of the upper cutter 68, thence extending horizontally, being slotted in the horizontal portion as at 192, the member 191 thence extending vertically upward as at 193, and to this vertically extending portion 193 there is secured a bail member 194, which is pivotally secured to the portion 193 and extends rearwardly over an upwardly extending pin 195, which is secured by means of a bracket 196 to a stationary portion of the structure. The horizontal portion of the member 191 extends through a suitable slot or opening 197 in the ring member 110, and a bolt 198 engages the slot 192. In the horizontal portion of the member 191, this bolt 198 passes through a portion of the ring member 110, being vertically movable therein, and having nuts 199 mounted on the upper end thereof which serve to confine a spring 200 which operates normally to raise the sector plate 190, when the upper forming roll and cutter are elevated, a sufficient distance to insure that the ring of scrap will not foul on the slight shoulder formed by the lower cutter 52. In order to prevent the ring of scrap from fouling on the under side, there is provided another sector plate 201, which extends around the under side of the forming roll, the front thereof terminating adjacent the forming bead 47. The sector plate 201 is secured by means of a bracket-like extension 202 to a stationary portion of the structure by means of a bolt 203, which passes through a slot 204, which slot is provided to permit such slight vertical adjustment as may be required.

The operation of the device last above described may now be explained. The sector plate 190 and its associated parts, when the forming roll and cutter are in the elevated position, are normally raised, in the position shown in dotted lines in Fig. 12. When, however, the upper forming roll and its associated cutter descend to effect the forming and trimming operation, the sector plate 190 will be depressed to the position shown in full lines, and will be held depressed until the upper forming roll and cutter are again raised. When the ring member 110 is thereafter moved foward in the manner hereinbefore described, for the purpose of removing the ring of scrap which is trimmed from the shell, the sector plate 190 will first be caused to rise to the elevated position shown in dotted lines, and will be carried forward with the ring member 110 until the same reaches the point where the bail member 194 engages the pin 195, whereupon the sector plate 190 will be restrained from further forward movement, the ring member, however, continuing to move forward to cause the ring of scrap to be pushed off the sector plate 190, and thereafter off the end of the lower forming roll 46.

It will be seen that, in the machine herein described, there is provided organized mechanism for automatically rolling beads, threads, nurling, and the like in the side walls of metal shells, in which the forming and trimming operations are simultaneously accomplished, whereby a greater uniformity of the product will be obtained; in which there is provided improved means for feeding the metal shells from the supply chute to the forming rolls, whereby fouling of the shells in the machine during the feeding will be reduced to a minimum; in which there is provided improved mechanism for removing the formed shells from the forming rolls; in which there is provided a separately actuated mechanism for removing from the forming rolls the scrap trimmed from the shells, whereby greater efficiency in the operation of the machine will be obtained by the individual adjustment of the shell ejector and scrap removing mechanism; and in which there is provided improved means for separating the scrap from the formed shells.

Having thus described the nature and characteristic features of my invention, what I claim as new and desire to secure by Letters Patent is:

1. In a machine of the character described, a pair of rotatable forming rolls and cutting devices associated therewith for forming and trimming metal shells, spindles upon which said forming rolls are mounted, one of said spindles being journaled in a stationary portion of the machine, a rocking frame in which the other of said spindles is journaled, a cam shaft, a cam mounted on said cam shaft for actuating said rocking frame, means for successively feeding the metal shells to the forming rolls, a cam mounted on the cam shaft and intervening mechanism for actuating said feeding means, ejector means for removing the formed shells from the forming rolls, and separately actuated means adapted to remove the scrap from the forming rolls.

2. In a machine of the character described, a power shaft, a pair of rotatable forming rolls and cutting devices associated therewith for forming and trimming metal shells, spindles upon which said forming rolls are mounted, one of said spindles being journaled in a stationary portion of the machine, a rocking frame in which the other of said spindles is journaled, means for transmitting motion from the power shaft to said spindles, a cam shaft, means for transmitting motion from said power shaft to said cam shaft, a cam mounted on said cam shaft for actuating said rocking frame, means for successively feeding the metal shells to the forming rolls, a cam mounted on the cam shaft and intervening mechanism for actuating said feeding means, ejector means for removing the formed shells from the forming rolls, and separately actuated means adapted to remove the scrap from the forming rolls.

3. In a machine of the character described, a pair of rotatable forming rolls and cutting devices associated therewith for forming and trimming metal shells, spindles upon which said forming rolls are mounted, one of said spindles being journaled in a stationary portion of the machine, a rocking frame in which the other of said spindles is journaled, a cam shaft, a cam mounted on said cam shaft for actuating said rocking frame, means for successively feeding the metal shells to the forming rolls, a cam mounted on the cam shaft and intervening mechanism for actuating said feeding means, ejector means for removing the formed shells from the forming rolls, a cam mounted on said cam shaft and intervening mechanism for actuating said ejector means, means adapted to strip the scrap from the forming rolls, and a cam mounted on said cam shaft and intervening mechanism for actuating said stripping means.

4. In a machine of the character described, a power shaft, a pair of rotatable forming rolls and cutting devices associated therewith for forming and trimming metal shells, spindles upon which said forming rolls are mounted, one of said spindles being journaled in a stationary portion of the machine, a rocking frame in which the other of said spindles is journaled, means for transmitting motion from the power shaft to said spindles, a cam shaft, means for transmitting motion from said power shaft to said cam shaft, a cam mounted on said cam shaft for actuating said rocking frame, means for successively feeding the metal shells to the forming rolls, a cam mounted on the cam shaft and intervening mechanism for actuating said feeding means, ejector means for removing the formed shells from the forming rolls, a cam mounted on said cam shaft and intervening mechanism for actuating said ejector means, means adapted to strip the scrap from the forming rolls, and a cam mounted on said cam shaft and intervening mechanism for actuating said stripping means.

5. In a machine of the character described, a pair of rotatable forming rolls and cutting devices associated therewith for forming and trimming metal shells, spindles upon which said forming rolls are mounted, one of said spindles being journaled in a stationary portion of the machine, a rocking frame in which the other of said spindles is journaled, a cam shaft, a cam mounted on said cam shaft for actuating said rocking frame, means for successively feeding the metal shells to the forming rolls, a cam mounted on the cam shaft and intervening mechanism for actuating said feeding means, ejector means for removing the formed shells from the forming rolls, a cam mounted on said cam shaft and intervening mechanism for actuating said ejector means, means adapted to strip the scrap from the forming rolls, and a cam mounted on said cam shaft and intervening mechanism for actuating said stripping means, said cams for actuating the ejector means and the stripping means being independently adjustable on the cam shaft.

6. In a machine of the character described, a power shaft, a pair of rotatable forming rolls and cutting devices associated therewith for forming and trimming metal shells, spindles upon which said forming rolls are mounted, one of said spindles being journaled in a stationary portion of the machine, a rocking frame in which the other of said spindles is journaled, means for transmitting motion from the power shaft to said spindles, a cam shaft, means for transmitting motion from said power shaft to said cam shaft, a cam mounted on said cam shaft for actuating said rocking frame, means for successively feeding the metal shells to the forming rolls, a cam mounted on the cam shaft and intervening mechanism for actuating said feeding means, ejector means for removing the formed shells from the forming rolls, a cam mounted on said cam shaft and intervening mechanism for actuating said ejector means, means adapted to strip the scrap from the forming rolls, and a cam mounted on said cam shaft and intervening mechanism for actuating said stripping means, said cams for actuating the ejector means and the stripping means being independently adjustable on the cam shaft.

7. In a machine of the character described, a pair of rotatable forming rolls and cutting devices associated therewith for forming and trimming metal shells, spindles upon which said forming rolls are mounted, one of said spindles being journaled in a stationary portion of the machine, a rocking frame in which the other of said spindles is journaled, a cam shaft, a cam mounted on said cam shaft for actuating said rocking frame, means for successively feeding the metal shells to the forming rolls, a cam mounted on the cam shaft and intervening mechanism for actuating said feeding means, ejector means for removing the formed shells from the forming rolls, a cam mounted on said cam shaft and intervening mechanism for actuating said ejector means, means adapted to strip the scrap from the forming rolls, a cam mounted on said cam shaft and intervening mechanism for actuating said stripping means, said cams for actuating the ejector means and the stripping means being independently adjustable on the cam shaft, and means for separating the scrap from the formed shells after the same are removed from the forming rolls.

8. In a machine of the character described, a power shaft, a pair of rotatable forming rolls and cutting devices associated therewith for forming and trimming metal shells, spindles upon which said forming rolls are mounted, one of said spindles being journaled in a stationary portion of the machine, a rocking frame in which the other of said spindles is journaled, means for transmitting motion from the power shaft to said spindles, a cam shaft, means for transmitting motion from said power shaft to said cam shaft, a cam mounted on said cam shaft for actuating said rocking frame, means for successively feeding the metal shells to the forming rolls, a cam mounted on the cam shaft and intervening mechanism for actuating said feeding means, ejector means for removing the formed shells from the forming rolls, a cam mounted on said cam shaft and intervening mechanism for actuating said ejector means, means adapted to strip the scrap from the forming rolls, a cam mounted on said cam shaft and intervening mechanism for actuating said stripping means, said cams for actuating the ejector means and the stripping means being independently adjustable on the cam shaft, and means for separating the scrap from the formed shells after the same are removed from the forming rolls.

9. In a machine of the character described, a pair of rotatable forming rolls and cutting devices associated therewith for forming and trimming metal shells, spindles upon which said forming rolls are mounted, one of said spindles being journaled in a stationary portion of the machine, a rocking frame in which the other of said spindles is journaled, a cam shaft, a cam mounted on said cam shaft for actuating said rocking frame, a supply chute, a slide member, a carrier mounted on said slide member having a pocket adapted to receive and transport the metal shells from the supply chute to the forming rolls, a cam mounted on the cam shaft and intervening mechanism for actuating said slide member, an escapement mechanism at the bottom of said supply chute, means controlled by said slide member for actuating said escapement mechanism, ejector means for removing the formed shells from the forming rolls, and separately actuated means adapted to remove the scrap from the forming rolls.

10. In a machine of the character described, a power shaft, a pair of rotatable forming rolls and cutting devices associated therewith for forming and trimming metal shells, spindles upon which said forming rolls are mounted, one of said spindles being journaled in a stationary portion of the machine, a rocking frame in which the other of said spindles is journaled, means for transmitting motion from the power shaft to said spindles, a cam shaft, means for transmitting motion from said power shaft to said cam shaft, a cam mounted on said cam shaft for actuating said rocking frame, a supply chute, a slide member, a carrier mounted on said slide member having a pocket adapted to receive and transport the metal shells from the supply chute to the forming rolls, a cam mounted on the cam shaft and intervening mechanism for actuating said slide member, an escapement mechanism at the bottom of said supply chute, means controlled by said slide member for actuating said escapement mechanism, ejector means for removing the formed shells from the forming rolls, and separately actuated means adapted to remove the scrap from the forming rolls.

11. In a machine of the character described, a power shaft, a pair of rotatable forming rolls and cutting devices associated therewith for forming and trimming metal shells, spindles upon which said forming rolls are mounted, one of said spindles being journaled in a stationary portion of the machine, a rocking frame in which the other of said spindles is journaled, means for transmitting motion from the power shaft to said spindles, a cam shaft, means for transmitting motion from said power shaft to said cam shaft, a cam mounted on said cam shaft for actuating said rocking frame, a supply chute, a slide member, a carrier mounted on said slide member having a pocket adapted to receive and transport the metal shells from the supply chute to the forming rolls, a cam mounted on the cam shaft and intervening mechanism for actuating said slide member, an escapement mechanism at the bottom of said supply chute, means controlled by said slide member for actuating said escapement mechanism, ejector means for removing the formed shells from the forming rolls, a cam mounted on said cam shaft and intervening mechanism for actuating said ejector means, means adapted to strip the scrap from the forming rolls, and a cam mounted on said cam shaft and intervening mechanism for actuating said stripping means.

12. In a machine of the character described, a power shaft, a pair of rotatable forming rolls and cutting devices associated therewith for forming and trimming metal shells, spindles upon which said forming rolls are mounted, one of said spindles being journaled in a stationary portion of the machine, a rocking frame in which the other of said spindles is journaled, means for transmitting motion from the power shaft to said spindles, a cam shaft, means for transmitting motion from said power shaft to said cam shaft, a cam mounted on said cam shaft for actuating said rocking frame, a supply chute, a slide member, a carrier mounted on said slide member having a pocket adapted to receive and transport the metal shells from the supply chute to the forming rolls, a cam mounted on the cam shaft and intervening mechanism for actuating said slide member, an escapement mechanism at the bottom of said supply chute, means controlled by said slide member for actuating said escapement mechanism, ejector means for removing the formed shells from the forming rolls, a cam mounted on said cam shaft and intervening mechanism for actuating said ejector means, means adapted to strip the scrap from the forming rolls, and a cam mounted on said cam shaft and intervening mechanism for actuating said stripping means, said cams for actuating the ejector means and the stripping means being independently adjustable on the cam shaft.

13. In a machine of the character described, a power shaft, a pair of rotatable forming rolls and cutting devices associated therewith for forming and trimming metal shells, spindles upon which said forming rolls are mounted, one of said spindles being journaled in a stationary portion of the machine, a rocking frame in which the other of said spindles is journaled, means for transmitting motion from the power shaft to said spindles, a cam shaft, means for transmitting motion from said power shaft to said cam shaft, a cam mounted on said cam shaft for actuating said rocking frame, a supply chute, a slide member, a carrier mounted on said slide member having a pocket adapted to receive and transport the metal shells from the supply chute to the forming rolls, a cam mounted on the cam shaft and intervening mechanism for actuating said slide member, an escapement mechanism at the bottom of said supply chute, means controlled by said slide member for actuating said escapement mechanism, ejector means for removing the formed shells from the forming rolls, a cam mounted on said cam shaft and intervening mechanism for actuating said ejector means, means adapted to strip the scrap from the forming rolls, a cam mounted on said cam shaft and intervening mechanism for actuating said stripping means, said cams for actuating the ejector means and the stripping means being independently adjustable on the cam shaft, and means for separating the scrap from the formed shells after the same are removed from the forming rolls.

14. In a machine of the character described, a rotatable internal forming roll upon which a metal shell having a closed end is adapted to be mounted, a complementally shaped rotatable external forming roll, means for bringing said forming rolls together to effect the forming operation and for thereafter separating the same, and a flange member arranged adjacent the external forming roll adapted to coact with the end of the metal shell to position the same upon the lower forming roll when said forming rolls are brought together during the forming operation.

15. In a machine of the character described, a rotatable internal forming roll upon which a metal shell having a closed end is adapted to be mounted, a complementally shaped rotatable external forming roll, means for bringing said forming rolls together to effect the forming operation and for thereafter separating the same, a pair of cutter disks associated with the forming rolls adapted when the forming rolls are brought together to effect the trimming operation, and a flange member arranged adjacent the external forming roll adapted to coact with the end of the metal shell to position the same upon the lower forming roll when said forming rolls are brought together during the forming and trimming operation.

16. In a machine of the character described, a rotatable internal forming roll upon which a metal shell having a closed end is adapted to be mounted, a complementally shaped rotatable external forming roll, means for bringing said forming rolls together to effect the forming operation and for thereafter separating the same, a cutting disk associated with the internal forming roll and having its peripheral surface adapted to form a portion of the support for the interior of the shell during the forming operation, a cutter disk associated with the external forming roll and having its peripheral surface extending slightly above the peripheral surface of the external forming roll and adapted when the forming rolls are brought together to effect the trimming operation, and a flanged member arranged adjacent the external forming roll adapted to coact with the end of the metal shell to position the same upon the lower forming roll when said forming rolls are brought together during the forming and trimming operation.

17. In a machine of the character described, a rotatable internal forming roll upon which a metal shell is adapted to be mounted, a complementally shaped rotatable external forming roll, means for bringing said forming rolls together to effect the forming operation and for thereafter separating the same, means adapted to receive and transport a metal shell to the internal forming roll when said forming rolls are in the separated position, and means for successively delivering the metal shells to the transporting means comprising a supply chute, and an escapement mechanism at the bottom of said supply chute, said escapement mechanism comprising a pinion, a pair of racks arranged on opposite sides of said pinion and adapted to be reciprocated with respect to each other when said pinion is actuated, a finger member carried by each of said racks, said finger members being adapted to be moved into and out of the path of the shells in the supply chute, and means for actuating said pinion at periodic intervals.

18. In a machine of the character described, a rotatable internal forming roll upon which a metal shell is adapted to be mounted, a complementally shaped rotatable external forming roll, means for bringing said forming rolls together to effect the forming operation and for thereafter separating the same, means adapted to receive and transport a metal shell to the internal forming roll when said forming rolls are in the separated position, and means for successively delivering the metal shells to the transporting means comprising a supply chute, and an escapement mechanism at the bottom of said supply chute, said escapement mechanism comprising a pinion, a pair of racks arranged on opposite sides of said pinion and adapted to be reciprocated with respect to each other when said pinion is actuated, a finger member carried by each of said racks, said finger members being adapted to be moved into and out of the path of the shells in the supply chute, and means controlled by the transporting means adapted to actuate said pinion.

19. In a machine of the character described, a rotatable internal forming roll upon which a metal shell is adapted to be mounted, a complementally shaped rotatable external forming roll, means for bringing said forming rolls together to effect the forming operation and for thereafter separating the same, means adapted to receive and transport a metal shell to the internal forming roll when said forming rolls are in the separated position, and means for successively delivering the metal shells to the transporting means comprising a supply chute, and an escapement mechanism at the bottom of said supply chute, said escapement mechanism comprising a spindle, a pinion mounted thereon, a pair of racks arranged on opposite sides of said pinion and adapted to be reciprocated with respect to each other when said pinion is actuated, a finger member carried by each of said racks, said finger members being adapted to be moved into and out of the path of the shells in the supply chute, a projecting arm carried by the aforesaid spindle, and members carried by the transporting means adapted to engage said projecting arm to actuate said pinion.

20. In a machine of the character described, a rotatable internal forming roll upon which a metal shell is adapted to be mounted, a complementally shaped rotatable external forming roll, means for bringing said forming rolls together to effect the forming operation and for thereafter separating the same, a slide member, a carrier mounted on said slide member having a pocket adapted to receive and transport a metal shell to the internal forming roll when said forming rolls are in the separated position, and means for successively delivering the metal shells to the pocket of said carrier, said means comprising a supply chute, and an escapement mechanism at the bottom of said supply chute, said escapement mechanism comprising a pinion, a pair of racks arranged on opposite sides of said pinion and adapted to be reciprocated with respect to each other when said pinion is actuated, a finger member carried by each of said racks, said finger members being adapted to be moved into and out of the path of the shells in the supply chute, and means for actuating said pinion at periodic intervals.

21. In a machine of the character described, a rotatable internal forming roll upon which a metal shell is adapted to be mounted, a complementally shaped rotatable external forming roll, means for bringing said forming rolls together to effect the forming operation and for thereafter separating the same, a slide member, a carrier mounted on said slide member having a pocket adapted to receive and transport a metal shell to the internal forming roll when said forming rolls are in the separated position, and means for successively delivering the metal shells to the pocket of said carrier, said means comprising a supply chute, and an escapement mechanism at the bottom of said supply chute, said escapement mechanism comprising a pinion, a pair of racks arranged on opposite sides of said pinion and adapted to be reciprocated with respect to each other when said pinion is actuated, a finger member carried by each of said racks, said finger members being adapted to be moved into and out of the path of the shells in the supply chute, and means controlled by the slide member adapted to actuate said pinion as said slide member approaches its extreme positions.

22. In a machine of the character described, a rotatable internal forming roll upon which a metal shell is adapted to be mounted, a complementally shaped rotatable external forming roll, means for bringing said forming rolls together to effect the forming operation and for thereafter separating the same, a slide member, a carrier mounted on said slide member having a pocket adapted to receive and transport a metal shell to the internal forming roll when said forming rolls are in the separated position, and means for successively delivering the metal shells to the pocket of said carrier, said means comprising a supply chute, and an escapement mechanism at the bottom of said supply chute, said escapement mechanism comprising a spindle, a pinion mounted thereon, a pair of racks arranged on opposite sides of said pinion and adapted to be reciprocated with respect to each other when said pinion is actuated, a finger member carried by each of said racks, said finger members being adapted to be moved into and out of the path of the shells in the supply chute, an arm carried by the aforesaid spindle, and members carried by the slide member adapted to engage said arm to actuate said pinion as said slide member approaches its extreme positions.

23. In a machine of the character described, a rotatable internal forming roll upon which a metal shell is adapted to be mounted, a complementally shaped rotatable external forming roll, means for bringing said forming rolls together to effect the forming operation and for thereafter separating the same, a slide member, a carrier mounted on said slide member having a pocket adapted to receive and transport a metal shell to the internal forming roll when said forming rolls are in the separated position, and means for successively delivering the metal shells to the pocket of said carrier, said means comprising a supply chute, and an escapement mechanism at the bottom of said supply chute, said escapement mechanism comprising a spindle, a pinion mounted thereon, a pair of racks arranged on opposite sides of said pinion and adapted to be reciprocated with respect to each other when said pinion is actuated, a finger member carried by each of said racks, said finger members being adapted to be moved into and out of the path of the shells in the supply chute, a projecting arm carried by the aforesaid spindle, and projecting members adjustably secured to the slide member and adapted to engage said projecting arm to actuate said pinion as said slide member approaches its extreme positions.

24. In a machine of the character described, a rotatable internal forming roll upon which a metal shell is adapted to be mounted, a complementally shaped rotatable external forming roll, means for bringing said forming rolls together to effect the forming operation and for thereafter separating the same, cutter disks associated with said forming rolls and adapted when the forming rolls are brought together to effect the trimming operation, and means adapted to strip the scrap from the lower forming roll when said forming rolls are separated.

25. In a machine of the character described, a rotatable internal forming roll upon which a metal shell is adapted to be mounted, a complementally shaped rotatable external forming roll, means for bringing said forming rolls together to effect the forming operation and for thereafter separating the same, cutter disks associated with said forming rolls and adapted when the forming rolls are brought together to effect the trimming operation, a member arranged adjacent the internal forming roll, and means for moving said member forward to strip the scrap from the lower forming roll when said forming rolls are separated.

26. In a machine of the character described, a rotatable internal forming roll upon which a metal shell is adapted to be mounted, a complementally shaped rotatable external forming roll, means for bringing said forming rolls together to effect the forming operation and for thereafter separating the same, cutter disks associated with said forming rolls and adapted when the forming rolls are brought together to effect the trimming operation, a collar member arranged adjacent the internal forming roll, and means for moving said collar member forward to strip the scrap from the lower forming roll when said forming rolls are separated.

27. In a machine of the character described, a rotatable internal forming roll upon which a metal shell is adapted to be mounted, a complementally shaped rotatable external forming roll, means for bringing said forming rolls together to effect the forming operation and for thereafter separating the same, cutter disks associated with said forming rolls and adapted when the forming rolls are brought together to effect the trimming operation, a collar member adapted to be moved forward to strip the scrap from the lower forming roll, and a cam and intervening mechanism for actuating said collar member.

28. In a machine of the character described, a rotatable internal forming roll upon which a metal shell is adapted to be mounted, a complementally shaped rotatable external forming roll, means for bringing said forming rolls together to effect the forming operation and for thereafter separating the same, cutter disks associated with said forming rolls and adapted when the forming rolls are brought together to effect the trimming operation, a hollow spindle upon which the internal forming roll is mounted, ejector means for removing the formed shell from the internal forming roll, a cam and intervening mechanism for actuating said ejector means, means adapted to strip the scrap from the internal forming roll, and a separate cam and intervening mechanism for actuating said stripping means.

29. In a machine of the character described, a rotatable internal forming roll upon which a metal shell is adapted to be mounted, a complementally shaped rotatable external forming roll, means for bringing said forming rolls together to effect the forming operation and for thereafter separating the same, cutter disks associated with said forming rolls and adapted when the forming rolls are brought together to effect the trimming operation, a hollow spindle upon which the internal forming roll is mounted, ejector means for removing the formed shell from the internal forming roll, a cam and intervening mechanism for actuating said ejector means, means adapted to strip the scrap from the internal forming roll, and a cam and intervening mechanism for actuating said stripping means, said cams for actuating the ejector means and stripping means being adjustable independently with respect to each other.

30. In a machine of the character described, a rotatable internal forming roll upon which a metal shell is adapted to be mounted, a complementally shaped rotatable external forming roll, means for bringing said forming rolls together to effect the forming operation and for thereafter separating the same, cutter disks associated with said forming rolls and adapted when the forming rolls are brought together to effect the trimming operation, a hollow spindle upon which the internal forming roll is mounted, an ejector rod slidably mounted in said hollow spindle, a cam and intervening mechanism for actuating said ejector rod, a collar member surrounding the hollow spindle upon which the internal forming roll is mounted, said collar member being adapted to be moved forward to strip the scrap from the internal forming roll, and a separate cam and intervening mechanism for actuating said collar member.

31. In a machine of the character described, a rotatable internal forming roll upon which a metal shell is adapted to be mounted, a complementally shaped rotatable external forming roll, means for bringing said forming rolls together to effect the forming operation and for thereafter separating the same, cutter disks associated with said forming rolls adapted when the forming rolls are brought together to effect the trimming operation, a hollow spindle upon which the internal forming roll is mounted, an ejector rod slidably mounted in said hollow spindle, a cam and intervening mechanism for actuating said ejector rod, a collar member surrounding the hollow spindle upon which the internal forming roll is mounted, said collar member being adapted to be moved forward to strip the scrap from the internal forming roll, and a cam and intervening mechanism for actuating said collar member, said cams for actuating the ejector rod and stripping collar being adjustable independently of each other.

In testimony whereof, I have hereunto signed my name.

JOHN A. DODD.